Oct. 17, 1939.  V. A. LARSEN  2,176,461
AIRCRAFT LANDING GEAR
Filed April 13, 1938　　　2 Sheets-Sheet 2
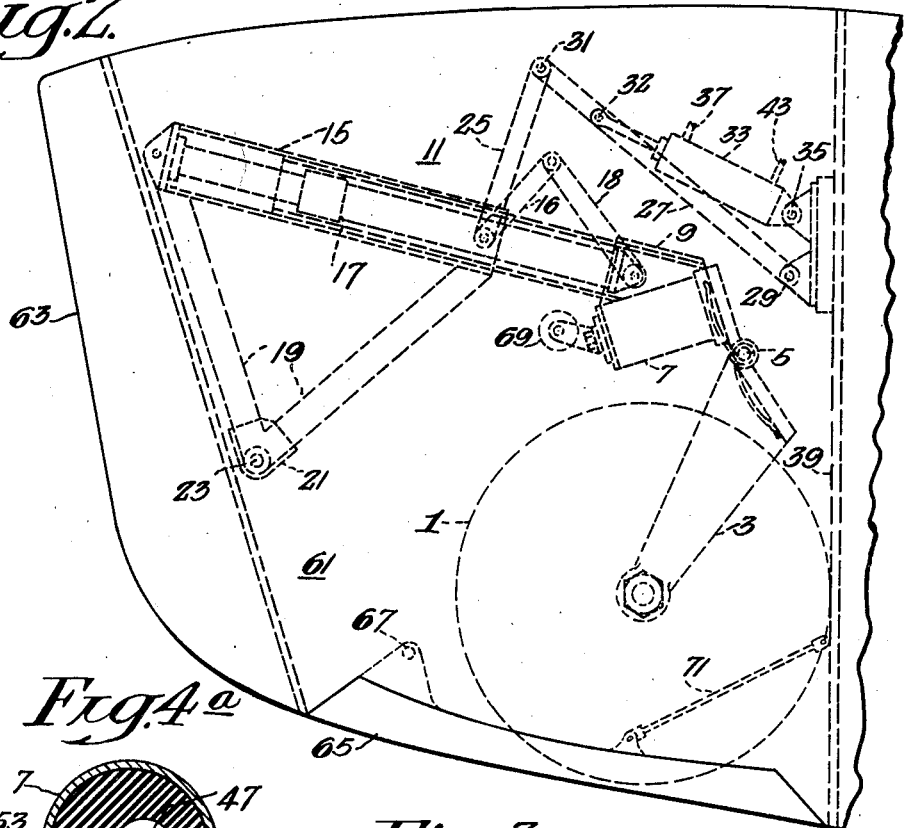
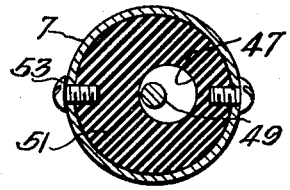
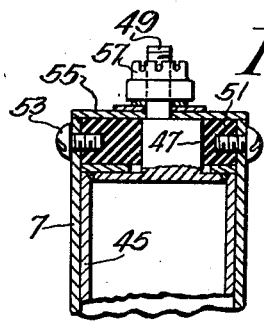
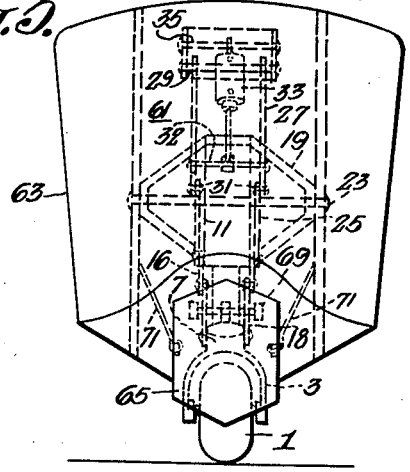
Inventor
Victor A. Larsen
By
Attorney Patented Oct. 17, 1939

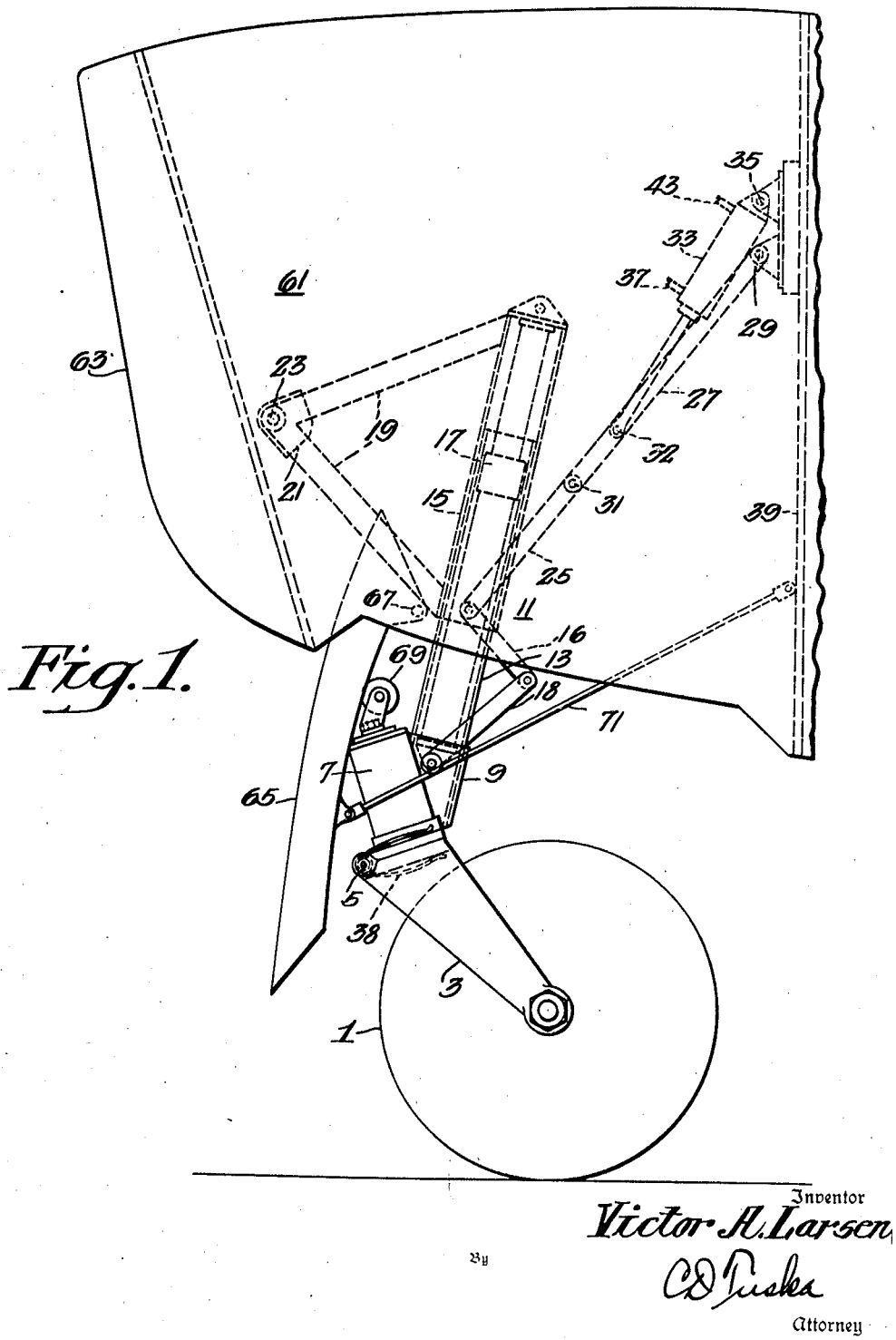

2,176,461

UNITED STATES PATENT OFFICE 2,176,461

AIRCRAFT LANDING GEAR

Victor A. Larsen, South Farmingdale, N. Y., assignor to Spencer-Larsen Aircraft Corporation Farmingdale, N. Y., a corporation of Delaware Application April 13, 1938, Serial No. 201,691

8 Claims. (Cl. 244—102)

My invention relates to aircraft landing gear, and more specifically to a retractable landing wheel and shock absorber.

Numerous types of retractable landing gear have been used on aircraft. Many of these prior gears have been complicated, expensive, or occupy relatively large amounts of space in their retracted positions. In some installations the space occupied by the retracted landing gear is of small importance; in other installations space is at a premium and must be conserved. My invention is especially suited to the latter installations; for example, the forewheel in an amphibian. Furthermore my invention is characterized by its simplicity, inexpensive construction, and small space requirements.

Among the objects of my invention are: to provide means for retracting the landing wheel of an aircraft within a small space, to provide means whereby a landing wheel may be retracted and extended with a minimum number of expensive parts, and to provide a simple inexpensive retractable landing wheel. Another object is to provide means for retracting and extending the forewheel of an amphibian aircraft. A further object is to provide means whereby a retractable landing gear may be folded within a small space when the gear is retracted and the wheel engages its housing.

My invention will be described by referring to the accompanying drawings in which Fig. 1 is a side view of the landing gear extended; Fig. 2 is a side view of the gear retracted; Fig. 3 is a front view of the gear extended; and Figs. 4A and 4B are fragmentary views of a portion of the caster members.

Referring to Fig. 1, a landing wheel, 1 which is preferably pneumatic, is rotatably mounted within a forked member 3. The forked member is hinged, as indicated by reference numeral 5, to a caster member 7. The caster member includes a fitting 9 within which is fastened a shock absorber assembly 11. The assembly 11 preferably consists of a pair of telescoping members 13, 15. The lower member 13 is a slidable fit within the upper member 15. The members 13, 15 are prevented from rotation about their common axis by means of a pair of torque links 16, 18 or the like.

An oleo strut shock absorber 17 is mounted within the telescoping members and fixed to the upper end of the upper member 15, and to the lower end of the lower member 13. Thus arranged the movements of the lower member 13 within the upper member 15 are regulated by the shock absorber 17, so that the assembly 11 in conjunction with the absorber forms a shock absorber, which operates when the wheel 1 strikes the ground. The upper member 15 of the assembly is rotatably mounted by V shape arms 19. These arms are joined to fittings 21 which form a bearing 23 for a shaft or the like. The axis of the shaft or bearing is normal to the shock movements of the shock absorber 11.

Rotation of the shock absorber 11 about its axis of rotation is prevented by means of the link members 25, 27. The upper link members 27 are pivotally mounted about a shaft 29 which may be suitably secured to the wheel housing. The lower link members 25 are pivotally mounted to the lower end of the member 15. The two link members are hinged together by a shaft 31. The link movements may be arrested by stops, and other means hereinafter described.

Retraction of the gear is effected by rotating the assembly 11 about the axis 23. One suitable means for rotating the assembly is to couple a hydraulic cylinder 33 between a shaft 32 mounted in the upper links and a fixed bearing 35. When fluid is forced into the lower connection 37 of the cylinder, the piston is forced upwardly carrying with it the shock absorber assembly 11. The assembly 11 will carry the caster member 7, 9, fork 3 and wheel 1. A biasing spring 38, which may be a part of the hinge 5, will keep the wheel in the position shown in Fig. 1, until the wheel engages the rear portion of the wheel housing 39. This engagement will fold the wheel assembly on the hinge. The completely retracted gear is illustrated in Fig. 2. The gear may be locked in its retracted position by suitable valves in the hydraulic lines, or equivalent means.

Extension of the gear is accomplished by forcing fluid into the upper fitting 43 of the cylinder 33. This will drive the piston downwardly, thereby moving the assembly 11 in a clockwise direction until the wheel is brought below its housing and restored to the position shown in Fig. 1. In this position the wheel assembly is limited in its movements about the hinge because the hinge can only be biased until it is closed. The link members 25, 27 limit the rotation of the gear by means of stops, by means of the limited piston motion within the hydraulic cylinder 33, and valves in the hydraulic lines.

The landing shocks are forces which tend to drive the gear to the rear, and upwardly. It will be observed that the angle which the shock absorber 11 makes with the horizontal, accommodates the components of these forces. The forces not taken up by the shock absorber, are largely turning moments about the axis 23 and a thrust through the links 25, 27. The wide spacing of the bearings 23 and 29 provides excellent distribution of the several forces within the wheel housing.

Since swivel movements of the wheel, with respect to the axis of the aircraft on which the gear is mounted, are very helpful in increasing ground maneuverability, I prefer to mount the wheel to permit such movements. If the wheel is swivelled, means must be provided to return it to a position parallel with the axis of the craft to prevent the interference which might otherwise result during retraction. One suitable and simple means of biasing the caster action is shown in Figs. 4A and 4B. Within the caster member 7 is rotatably mounted a shaft 45. The lower end of the shaft carries the hinge 5 (not shown). On the upper end of the shaft are arranged an eccentric member 47 and a concentric stud 49. A rubber disc 51, which includes an eccentric aperture, is mounted over the eccentric member 47 and secured to the caster member 7 by set screws 53 or the like.

The shoulder portion of the shaft is preferably separated from the rubber member by a washer. The upper part of the rubber member bears against an end plate 55. The end plate is held in place by any suitable means including a nut 57, which is threaded over the stud 49 to hold the shaft 45 in place. Upward movement of the shaft is prevented by a shoulder shown in Fig. 1. The rubber member provides a yielding movement to the shaft and offers sufficient resistance to restore the wheel to its normal fore and aft position. It should be understood that conventional biasing springs may be substituted for the rubber member.

For purposes of illustration, and as an example of one application of my invention, the gear is arranged in Figs. 1 and 3 as the forewheel in an amphibian aircraft. A well or watertight compartment 61 is arranged within the hull 63. The bearings 23, 29 are secured to the sidewalls of the well, and the fixed bearing 35 for the hydraulic cylinder 33 is mounted on the rear wall of the well. The landing wheel 1 is extended through an opening in the well. The opening is closed, when the gear is retracted, by a door 65. The door is pivotally mounted to the hull by a hinge 67. Preferably rollers 69, which may be mounted on the upper portion of the caster member 7, engage the inner portion of the door to force it open and guide its closing. Springs, shock cords 71 or the like keep the rollers and the door in engagement, and hold the door against the opening in the hull when the gear is retracted. If the contacts of the door and the rollers are substantially parallel to the shock absorber assembly, motion of the door will be prevented when it engages the ground.

Thus I have described a simple, inexpensive, retractable landing gear, which is especially adapted to operate in a limited space. It is a gear which may be used as a rear wheel or forewheel of an aircraft. It may be retracted or extended by a minimum number of moving parts. While for convenience in servicing I prefer to use a separate oleo strut shock absorber within the assembly, it should be understood that the two parts may be combined into a single assembly.

Furthermore the invention is not limited to any particular type of shock absorber, as compressed air, rubber or the like may be substituted. In general the invention is not restricted to the precise illustrations, which have been given more by way of example than limitation.

I claim:

1. A retractable wheel mechanism including in combination a wheel, a forked bearing member for said wheel, a hinged mounting for said forked member, a shock absorber assembly carrying said hinged mounting and pivotally mounted on an axis parallel to the axis of said wheel, and means engaging said wheel for effecting movements of said hinged mounting during retraction, whereby said wheel may be retracted by rotating said assembly about said first named axis, and by the operation of said hinged mounting.

2. A retractable wheel mounting including in combination a shock absorber rotatably mounted about an axis normal to the shock movements of said absorber, a hinged member mounted adjacent one end of said absorber, a forked member fixed to said hinged member, a wheel rotatably mounted within said forked member, means engaging said wheel for effecting movements of said hinged member during retraction and means for limiting the movement of said hinged member, whereby said wheel is fixed with respect to the end of said shock absorber when extended, and whereby said wheel and fork may be rotated with respect to said end for retraction.

3. A retractable wheel mounting including in combination a shock absorber, means for mounting said shock absorber for rotation about an axis normal to the shock movements of said absorber, means for effecting said rotation, a caster member mounted on one end of said shock absorber, a hinged member fixed to said caster, a forked member carried by said hinged member, a wheel rotatably mounted within said forked member, and means engaging said wheel for effecting movements of said hinged member upon retraction of said shock absorber by said rotation.

4. In a device of the character of claim 3 means for limiting the movements of said hinged member when said wheel mounting is extended.

5. In a device of the character of claim 3 means for preventing rotation of said shock absorber about said axis of rotation when said wheel mounting is extended.

6. In a device of the character of claim 3 means for limiting the movements of said hinged member and means for preventing rotation of said shock absorber about its axis of rotation when said wheel mounting is extended.

7. An aircraft retractable landing gear including in combination a shock absorber mounted for rotation on an axis normal to the shock movements of said absorber, a caster member including a swivel shaft carried by said shock absorber, a hinged member secured to said swivel shaft, a wheel bearing member including a landing wheel carried by said hinged member, means for biasing said swivel shaft, and means for biasing said hinged member.

8. In a device of the character of claim 7, means for rotating said shock absorber about said axis, whereby said landing gear may be retracted.

VICTOR A. LARSEN.